United States Patent [19]

Iwaoka

[11] Patent Number: 4,674,847
[45] Date of Patent: Jun. 23, 1987

[54] BINOCULAR FOCUSING DEVICE
[75] Inventor: Nobuo Iwaoka, Tokyo, Japan
[73] Assignee: Seiwa Instruments Manufacturing Co., Ltd., Saitama, Japan
[21] Appl. No.: 859,500
[22] Filed: May 5, 1986
[30] Foreign Application Priority Data Dec. 23, 1985 [JP] Japan .................. 60-196496[U]

[51] Int. Cl.⁴ .................. G02B 7/06; G02B 23/00
[52] U.S. Cl. .................. 350/552; 350/563
[58] Field of Search .................. 350/552, 548–551, 350/545, 553, 556, 563, 564

[56] References Cited
U.S. PATENT DOCUMENTS 4,240,690 12/1980 Kimura .................. 350/552
4,306,764 12/1981 Kikuchi .................. 350/552

FOREIGN PATENT DOCUMENTS 1184909 10/1983 Japan .................. 350/548

Primary Examiner—Jon W. Henry
Attorney, Agent, or Firm—George B. Oujevolk

[57] ABSTRACT

In a pair of binoculars, the left and right control pieces are connected to a bridge on the body of the binoculars by means of a securing mechanism so that when one of these pieces is pushed down, the corresponding piece is automatically depressed.

The slanted opening of the control piece and the bridges guide opening are connected. Also a connecting pole for the control pieces and the rod which enables the ascent and descent, is fixed, and because of this connecting rod the eyepiece lenses can be extended or retracted smoothly.

3 Claims, 5 Drawing Figures

BINOCULAR FOCUSING DEVICE

FIELD OF THE INVENTION

The present invention relates to the focusing of binoculars and more particularly to the mechanical arrangement to telescope and retract the binocular lens. Because of the way the eyepiece lenses of this newly developed binocular can be extended or retracted, they can be focused smoothly, moreover, the focus can be adjusted speedily because of this focusing device.

BACKGROUND OF THE INVENTION

Up until the present, to adjust the focus of the type of binoculars which have both eyepieces extending from the center, the eyepieces must be extended or retracted by means of a knob attached to the rotating arm on the left and right sides of the body of the binoculars.

By revolving this wheel the focus can be adjusted accordingly, i.e., the lens telescope in or outwards. However, to obtain precise focusing, this method requires some effort and because it takes some time, where situations require immediate focusing, or when you want to observe a particular scene, this procedure is not efficient in terms of speed.

The present invention is directed to the elimination of these faults, by the use of the newly developed focus adjusting device.

BRIEF DESCRIPTION OF THE PRIOR ART

As illustrated in FIG. 5 taken from U.S. Pat. No. 4,066,329, using crosspiece 7, the securing pin of the control shafts is controlled and the slant guides which have grooved surfaces at the front of the body are designed as one piece, furthermore another feature of this focus adjustment device is the fact that sections 3 and 4 of the body of the binoculars can move freely because they are attached by a pipe-like fixture.

However, the above mentioned focus adjustment device should be accurately aligned with the elongated guide hole 6b which is designed like a pipe, but if the slanted guide hole or cam 5b is not accurately aligned with the focus device body 5, friction will occur along the slanted guide hole 5b between the extension and retraction controlling rods 9 and 9b, and the quick focus mechanism will develop problems. Furthermore, using the previously mentioned body 5 as a revolving axis, when you adjust the wing shaped extensions 1 and 2 either left or right to focus, the entire body of the binoculars will be jolted which makes it difficult to obtain a quick focus.

SUMMARY OF THE INVENTION

An object of the present invention is to provide a focus adjustment which can focus quickly and easily by the telescopic extension and retraction of the eyepiece lenses.

A second object of the invention is to provide a focusing adjustment mechanism which once depressed, can quickly focus the binoculars in a stable conditions without the need for the adjustment of a central dial. The effectiveness of this newly developed binocular focus adjustment device is illustrated by the following explanation. Because the inclination guide is designed to cross the right and left central shafts at an approximate angle of 60°, when one shaft is depressed, the securing pin can move back and forth along an elongated opening of the connecting rod, extending and retracting, while simultaneously, the lens focus can be raised and lowered. In this instance, using a pair of shafts, one shaft can be raised in the opposite direction of its pair.

The lens telescoping focus ascent and descent axis can be raised or lowered in accordance with the movement of the right and left control shafts. Furthermore, the slant guide hole in the right and left control shafts are designed to cross at 60° and because both ends of securing pins are inserted in such a way that they are mobile, when you depress the right control shaft the securing pin rises along the slant guide hole and the elongated guide hole simultaneously as the left control shaft is lowered by the pin, the eyepiece lens which is connected with the ascent and descent rod rises, and the lenses can be quickly focused. Furthermore, the right and left control shafts are smooth so as to enable them to move freely up and down the side walls of the bridge. Instant focus can be achieved because of this feature; moreover the fact that blurring has been eliminated and there is no need for special care is a particularly advantageous feature of this invention.

The invention as well as other objects and advantages thereof will become more apparent from the following detailed description when taken together with the accompanying drawings, in which:

DETAILED DESCRIPTION

Figure 2:
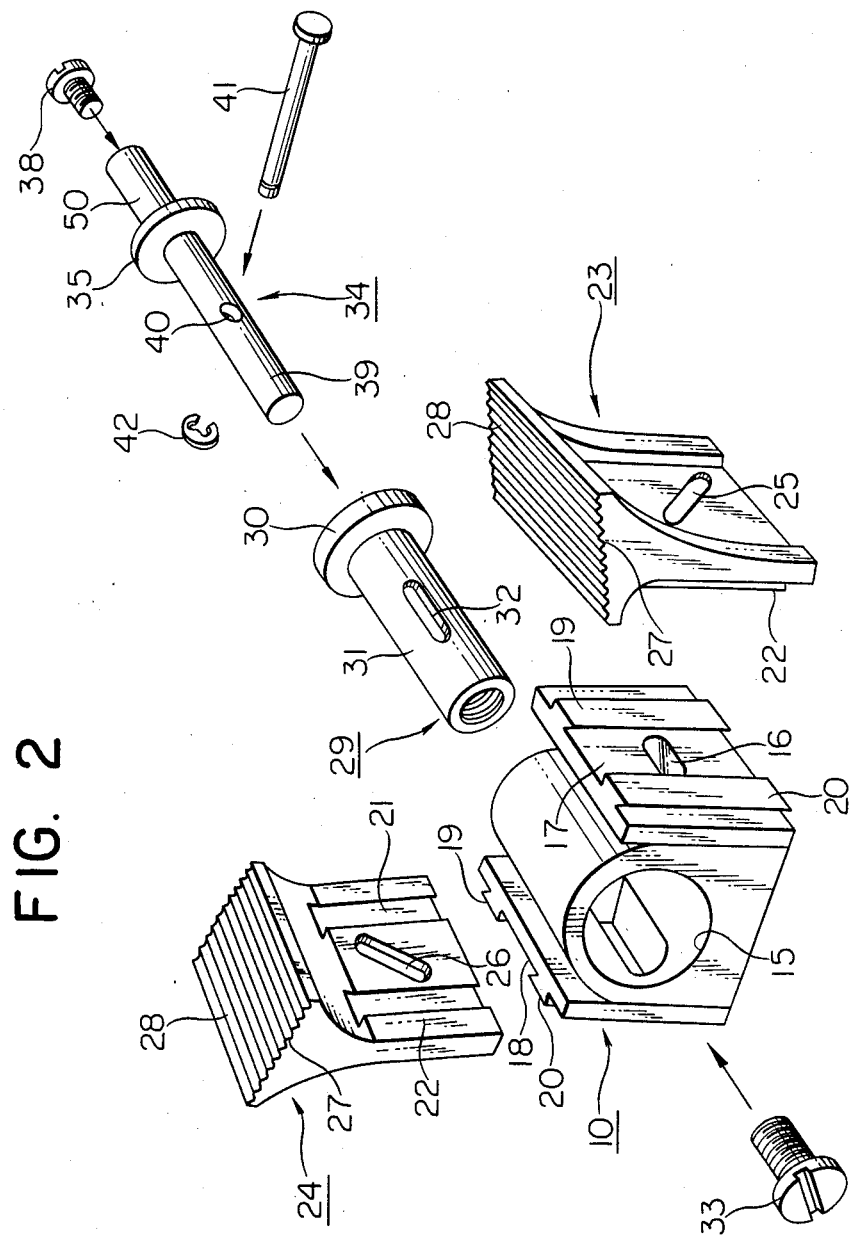
FIG. 2 illustrates the separate parts of the device.
Figure 3:
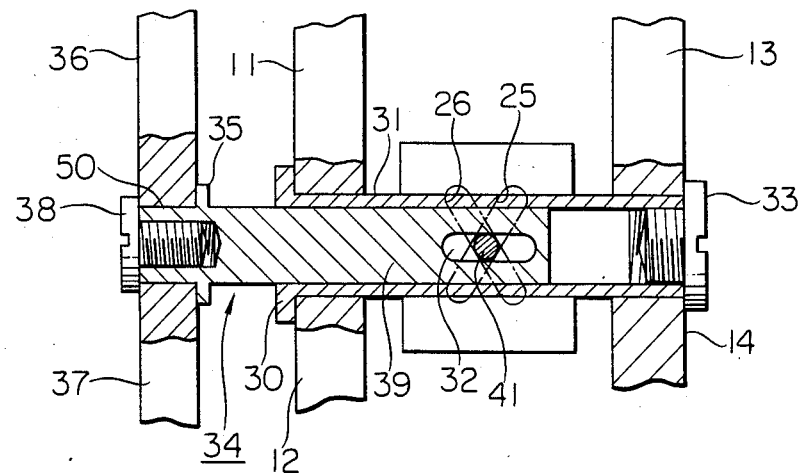
FIG. 3 shows the relationship of the securing pin with the guide hole of the device.

The following is an explanation of the operation of the device based on the drawings 1 and 4 showing the bridge piece 10 which is located between the eyepiece ends, i.e., eyepiece lenses side arms 11 and 12 (upper arm) and the objective ends, i.e., object lenses side arms 13 and 14. This bridge piece 10 is made from a composite metals namely a die-cast alloy and combined soft metals like plastic materials. This bridge 10 is designed so that tube 15 can pass through it lengthwise and opening 16 can penetrate it at right angles. FIG. 2 shows how elongated opening 16 is located between sidewalls 17 and 18 of the bridge piece, and on either side are rails 19 and 20 which are designed with protruding angled edges for extra security. The protruding and indented rails, 19 and 20, are designed to connect with slots 21 and 22 located in right and left control pieces 23 and 24, openings 25 and 26, are fixed angle guide openings located between slots 21 and 22. The control pieces 23, 24 have an upper section 27 designed to interlock with a control surface 28 which has a grooved surface. The eyepiece lens side arms 11 and 12 pass through a bridge or connecting pipe 29. At one end of pipe 29 is a flange 30 and the rest of pipe 29 is a tube shaped portion 31 which is inserted into bridge piece 10 through tube 15. In this tube-shaped portion 31 there is an elongated opening 32. At the other end of tube-shaped portion 31 are the objective ends, i.e., object lenses side arms 13 and 14 which are secured by means of a central bolt 33. A rod 34 is designed to be telescopingly inserted and retracted through pipe 29 which is a tubular axis. And at the outer end rod 34 is hollow part 50 which works in conjunction with a flange 35 on rod 34 and is attached to lens holders 36 and 37 by means of a bolt 38 which is secured in place. The inner part 39 of rod 34 has an opening 40 which fixes it in position. A securing pin 41 passes through opening 40 and is part of the up and down rod 34 and fixes rod 34 in position. One part of this securing pin 41 which is illustrated in FIG. 2, passes through the elongated slanted opening 25 in the control piece 23 and at the same time, passes through elongated opening 16 in the bridge through pipe 29, the up and down rod 34, to the elongated slanted opening 26 and is firmly secured with the stop ring nut 42.

Figure 1:
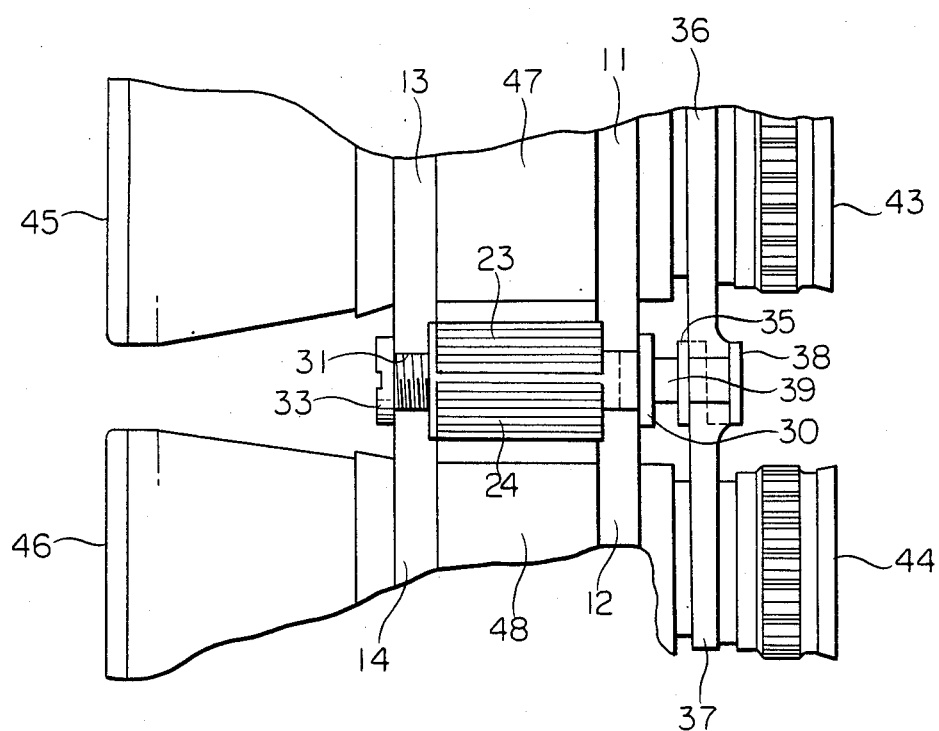
FIG. 1 is a simplified plane drawing of the new focusing device.
Figure 4:
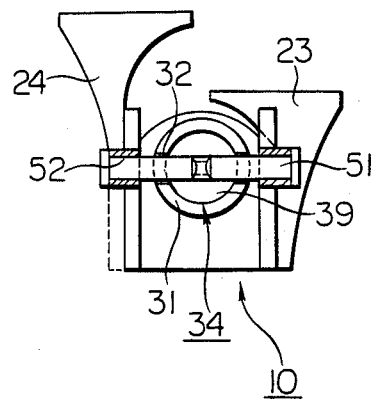
FIG. 4 is a cross-sectional view showing other parts relating to the focusing device.
Figure 5:
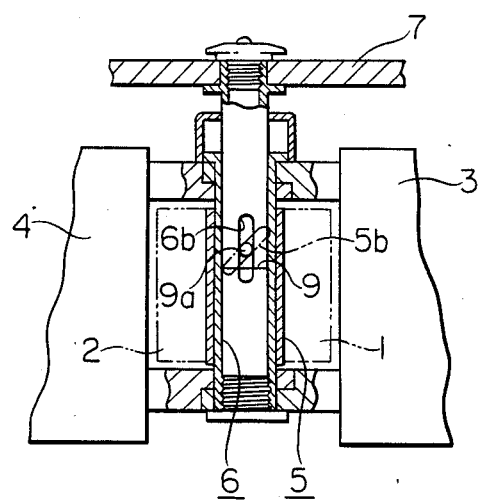
FIG. 5 is a cross-sectional view showing an effective illustration of the novelty of the present invention.

To complete the illustration there are shown eyepiece lens 43 and 44, objective lenses 45 and 46 and right and left sections 47 and 48 of the casing. The binoculars are assembled as follows: First after left and right sections 47 and 48 are attached to the bridge pipe 29, passed through the eyepiece lens arms 11 and 12 and also through tube 15 in the bridge pipe, the bridge pipe 29 then connected with arms 13 and 14 at the end of the objective lens which are secured to the bridge pipe by means of bolt 33. The eyepiece ends 11, 12 are thus fixed against moving left or right relative to the structure to the left in FIG. 1 and the structure to the right of the eyepiece ends 11 and 12, except that flange 30 can move to vary the focusing. Thus, after having inserted the lenses focus up and down rod 34 into the bridge pipe 29, end section 50 of rod 34 connects lens holders 36 and 37 and is secured by means of an upper bolt 38. Next, having attached right and left control pieces 23 and 24 horizontally by placing the rails 19 and 20 into slots 21 and 22, securing pin 41 is used and passed through the elongated opening 25 in control piece 23 through elongated aperture 16 of the bridge piece 10, the elongated opening 32 of pipe 29, opening 40 in the lens focus up and down rod 34, continuing through the elongated opening on the opposite side of the bridge piece 10, through the elongated opening 26 in control piece 24 and fasten with stop ring nut 42. FIG. 4 illustrates a cross-section of the relevant parts in another embodiment and the only point of difference to the above explanation is that in bridge piece 10 the elongated through holes in control pieces 23 and 24 are aligned with the bridge piece 10 and secured with bolt parts 51 and 52.

When the control piece 23 is depressed, because of the slanted guide opening 26, the opposite control piece 24 is raised, and the lens focus telescoping rod is raised smoothly simultaneously. It is to be observed that the present invention provides for a binocular focusing arrangement for a pair of binoculars having a pair of eyepiece lens and a pair of objective lens, which must be moved up and down with respect to the eyepiece lens so as to bring an object into focus when viewed. The arrangement includes eyepiece ends, i.e., upper arms 11, 12, as well as lens holders 36, 37 to support the eyepiece lenses and objective ends i.e., lower arms 13, 14 to support the objective lens (45, 46). Forming part of the arrangement is a box-like bridge piece 10 disposed between the upper and lower arms. This bridge piece 10 has side walls 17, 18 with slide means 19, 20 i.e., rails which are spaced apart along the side walls. There is a large cental aperture 15 normal to the slide means or rails and also a central elongated slot 16 in the side walls normal to the rails or slide means, and parallel to the central aperture 15. The up and down movement of the objective lens is controlled by right and left control pieces 23, 24 with guides 21, 22 disposed for receiving the slide means or rails 19, 20 therein. Also in each control piece are slanted slots 25, 26 which are slanted at an approximate angle of 60° with respect to the guides or tracks 21, 22. These slanted slots are disposed to cooperate with the elongated slots 16 in the bridge piece 10, the slant of the slanted slot in one control piece 23 being in the opposite direction to the corresponding slot 26 in the other control piece 24. Each control piece has an upper finger engagable or grooved surface 28. Passing through the central aperture 15 is a pipe 29 having a longitudinal pipe slot 32 disposed to cooperate with corresponding slots 16, 25, 26 in the bridge piece 10 and in the control pieces 23, 24, a tube-shaped portion 31 at one end of said pipe 29 and screw fastening means 33 designed to cooperate with the tube-shaped portion 31 to hold the lower arms 13, 14. Second fastening means or a screw is provided at the other end of said pipe 29 to hold the upper arms 11, 12. Moving longitudinally in the pipe 29 is a telescoping rod 39 which cooperates with of the second fastening means. Passing through the various slots in a securing pin means 41. Thus, when one control piece 23 is depressed, because of the slanted slots, the other control piece 24 is raised and the lens focus up and down rod 34 moves smoothly. The telescoping rod 39 and the pipe 29 include a flange 30 on the pipe so as to limit the invention of the pipe 29 into the bridge piece tube 15. The telescoping rod 39 also has a flange 35 and an aperture 40 so that the securing means or pin 41 can pass through the telescoping rod.

What is claimed is:

1. A binocular focusing arrangement for a pair of binoculars having a pair of eyepiece lenses and a pair of objective lenses which must be moved up and down with respect to the eyepiece lenses to bring an objective being viewed into focus, including a central telescoping rod (39) with holders (36, 37), connected to the central rod (39) as well as eyepeice ends (11, 12) also connected to the central rod (39) to support the eyepiece lenses (43, 44) and objective ends (13, 14) to support the objective lenses (45, 46), said focusing arrangement comprising in combination:

(1) a box-like bridge piece (10) disposed between the eyepiece ends and the objective ends, said bridge piece (10) having side walls (17, 18), with slide means (19, 20) spaced apart along the side walls, a large central aperture (15) normal to said slide means, also a central elongated slot (16) in the side walls normal to the rails, and parallel to said central aperture (15);

(2) right and left control pieces (23, 24) with guides (21, 22) disposed for receiving the slide means (19, 20) therein, slanted slots (25, 26) in each control piece, slanted with respect to the guides (21, 22), said slanted slots (25, 26) being disposed to cooperate with the elongated slots (16) in the bridge piece (10), the slant of the slanted slot (25) in right control piece (23) being in the opposite direction to the slant of the corresponding slanted slot (26) in the left control piece (24), an upper finger engagable surface (28) on each control piece;

(3) a pipe (29) passing through the central aperture (15) said pipe (29) having a longitudinal pipe slot (32) disposed to cooperate with corresponding slots (16, 25, 26) in the bridge piece (10) and in the control pieces (23, 24), a tube-shaped portion (31)

at one end of said pipe (29) and first fastening means (33) designed to cooperate with said tube-shaped portion (31) to hold the objective ends (13, 14), and second fastening means at the other end of said pipe (29) designed to hold the eyepiece ends (11, 12), said central telescoping rod (39) moving longitudinally in the pipe (29); and, (4) securing means (41) passing through the various slots, whereby when one control piece (23) is depressed, because of the slanted slots, the other control piece (24) is raised and the lens focus up and down rod (34) moves smoothly at the same time.

2. An arrangement as claimed in claim 1 wherein the slide means are rails (19, 20) and the guides are longitudinal grooves (21, 22) disposed to receive the rails therein.

3. An arrangement as claimed in claim 2 wherein said central telescoping rod (39) and said pipe (29) include a flange (30) on said pipe at one end of the pipe and a tube shaped portion (31) the tube shaped portion, limited by the flange being inserted in the bridge piece (10) through its tube (15), fastening means (33) holding said tube shaped portion in place so that the pipe slot (32) is aligned with the other slots, a rod flange (35) at one end of the telescoping rod (34), an aperture (40) in said telescoping rod (34), also said securing means being a pin (41) engaging a locking ring nut (42).

* * * * *